United States Patent
Ng et al.

(10) Patent No.: US 10,781,375 B2
(45) Date of Patent: Sep. 22, 2020

(54) FROTH WASHING PRIOR TO NAPHTHA DILUTION

(71) Applicant: SYNCRUDE CANADA LTD. in trust for the owners of the Syncrude Project as such owners exist now and, Fort McMurray (CA)

(72) Inventors: Yin Ming Samson Ng, Sherwood Park (CA); Sujit Bhattacharya, Edmonton (CA); Allan W. K. Leung, Edmonton (CA)

(73) Assignee: SYNCRUDE CANADA LTD. in trust for the owners of the Syncrude Project as such owners exist now and in the future, Fort McMurray (CA)

( * ) Notice: Subject to any disclaimer, the term of this patent is extended or adjusted under 35 U.S.C. 154(b) by 0 days.

(21) Appl. No.: 16/123,961

(22) Filed: Sep. 6, 2018

(65) Prior Publication Data
US 2019/0078024 A1   Mar. 14, 2019

Related U.S. Application Data

(60) Provisional application No. 62/556,928, filed on Sep. 11, 2017.

(51) Int. Cl.
*C10G 1/00* (2006.01)
*C10C 3/08* (2006.01)
*C10C 3/02* (2006.01)
*C10C 1/04* (2006.01)
*B01D 21/26* (2006.01)

(52) U.S. Cl.
CPC .............. *C10C 3/08* (2013.01); *C10C 1/04* (2013.01); *C10C 3/026* (2013.01); *B01D 21/262* (2013.01)

(58) Field of Classification Search
CPC .................................. C10G 1/04; C10C 3/08
See application file for complete search history.

(56) References Cited

U.S. PATENT DOCUMENTS

| 5,236,577 | A  | * | 8/1993 | Tipman ............... | C10G 1/047 208/390 |
| 6,746,599 | B2 |   | 6/2004 | Cymerman et al. | |
| 2009/0200209 | A1 | * | 8/2009 | Sury .................... | C10G 1/045 208/390 |
| 2013/0056395 | A1 | * | 3/2013 | Pierre, Jr. ............. | C10G 1/002 208/390 |
| 2014/0042055 | A1 | * | 2/2014 | Brownie ............... | C10G 21/16 208/45 |

(Continued)

FOREIGN PATENT DOCUMENTS

| CA | 1072473 A | 2/1980 |
| CA | 1293465 A | 2/1988 |

(Continued)

*Primary Examiner* — Prem C Singh
*Assistant Examiner* — Brandi M Doyle
(74) *Attorney, Agent, or Firm* — Bennett Jones LLP

(57) ABSTRACT

A method for processing bitumen froth to produce a diluted bitumen product having a reduced water and solids content is provided, comprising: adding a sufficient amount of water to the bitumen froth and mixing the bitumen froth and water to form a froth/water mixture; diluting the froth/water mixture with naphtha to form a diluted froth; and separating the water and solids from the diluted froth to produce the diluted bitumen product.

17 Claims, 10 Drawing Sheets

(56) References Cited

U.S. PATENT DOCUMENTS

2015/0315477 A1* 11/2015 Ng ............................ C10G 1/04
                                                                208/390

FOREIGN PATENT DOCUMENTS

| CA | 2029795 | A1 | 11/1989 |
| CA | 1264455 | A  | 1/1990  |
| CA | 1267860 | A  | 4/1990  |
| CA | 2217623 | A1 | 10/1997 |
| CA | 2787174 | A1 | 2/2014  |

* cited by examiner

FROTH WASHING PRIOR TO NAPHTHA DILUTION

FIELD OF THE INVENTION

The present invention relates generally to a method for processing bitumen froth to produce a naphtha diluted bitumen product having reduced water and solids. In particular, the invention is related to froth washing with water prior to naphtha dilution.

BACKGROUND OF THE INVENTION

Natural oil sand is a complex mixture of sand, water, clay fines and bitumen. A typical composition of oil sand is 10 wt % bitumen, 5 wt % water and 85 wt % solids. Water based extraction processes are used to extract the bitumen from oil sand to produce an extraction product which is referred to in the industry as "bitumen froth". Generally, bitumen froth quality produced from bitumen extraction has a composition of ~60 wt % bitumen, ~30 wt % water and ~10 wt % solids. Examples of bitumen extraction processes include the Clark Hot Water Process, a warm water extraction process as described in Canadian Patent No. 2,029,795, and a low energy process as described in Canadian Patent No. 2,217,623.

Unfortunately, the extraction product (i.e., bitumen froth) is not suitable to feed directly to bitumen processing/upgrading plants. Hence, the bitumen froth needs to be first treated before it is suitable for further upgrading. Such treatment is referred to in the industry as "froth treatment". The primary purpose of froth treatment is to remove the water and solids from the bitumen froth to produce a clean diluted bitumen product (i.e., "diluted bitumen" or "dilbit") which can be further processed to produce a fungible bitumen product that can be sold or processed in downstream upgrading units. There are two main types of froth treatment used in the industry today; a naphtha-based froth treatment and a paraffinic-based froth treatment.

Naphtha-based froth treatment processes generally use gravity and centrifugal separation technology. Naphtha is a solvent which is used to change the hydrocarbon viscosity and density properties such that it is more amenable to mechanical separation. Naphtha-based froth treatment processes can supply a high quality diluted bitumen product to the bitumen processing plants while minimizing hydrocarbon losses in the tailings.

Separation of the bitumen from water and solids may be done by treating the naphtha-diluted bitumen froth in a sequence of scroll and disc centrifuges (see, for example, Canadian Patent No. 1,072,473). Alternatively, the dilfroth may be subjected to gravity separation in a series of inclined plate separators ("IPS") in conjunction with countercurrent solvent extraction using added light hydrocarbon diluent (see, for example, Canadian Patent Nos. 1,267,860 and 1,293,465). More recently, a staged settling process (often referred to as Stationary Froth Treatment or SFT) for cleaning dilfroth was developed as described in U.S. Pat. No. 6,746,599, whereby dilfroth is first subjected to gravity settling in a splitter vessel to produce a splitter overflow (raw diluted bitumen or "dilbit") and a splitter underflow (splitter tails) and then the raw dilbit is further cleaned by gravity settling in a polisher vessel for sufficient time to produce an overflow stream of polished dilbit and an underflow stream of polisher sludge. Residual bitumen present in the splitter tails can be removed by mixing the splitter tails with additional naphtha and subjecting the produced mixture to gravity settling in a scrubber vessel to produce an overhead stream of scrubber hydrocarbons, which stream is recycled back to the splitter vessel.

However, the quality of bitumen froth produced during extraction can vary depending on a number of factors, for example, whether a low bitumen content ore or a high fines content ore is being extracted. Poorer froth quality produced during bitumen extraction has been found to cause separation issues during naphtha-based froth treatment resulting in deterioration of the diluted bitumen product quality and often leads to froth treatment capacity restriction. In addition, the high water and solids content in froth treatment product (diluted bitumen) can also lead to major operation issues in downstream bitumen processing as results of corrosion and erosion in processing equipment.

There have been attempts in the industry to improve bitumen froth quality produced during extraction to provide a better product for froth treatment. At present, two bitumen froth cleaning technologies are commonly used commercially, namely, lean froth recycle for secondary froth (see, for example, Canadian Patent No. 1,264,455) and froth underwash in primary separation vessel for primary froth (see, for example, Canadian Patent No. 2,787,174). However, the final diluted bitumen product quality is sometimes still not suitable to feed the bitumen processing plants, especially during the high fines oil sand feed conditions.

Accordingly, there is a need for a method for processing a bitumen froth that consistently produces a diluted bitumen product with quality suitable for the bitumen processing operations, regardless of the quality of the starting bitumen froth.

SUMMARY OF THE INVENTION

Bitumen froth water comprises two main types of water, namely, free water and dispersed water, i.e., water that is dispersed within the bitumen. Further, the solids in bitumen froth can be separated into hydrophilic, bi-wet and hydrophobic solids. It was discovered by the present applicant that free water and hydrophilic solids are relatively easy to remove using naphtha-based froth treatment, but dispersed water, depending on the droplet size, can often be more difficult to remove. Thus, depending on the proportion of free versus dispersed water in the froth and the type of solids present, there can be significant separation problems during froth treatment which may result in a diluted bitumen product that is inadequate as feed to bitumen processing plants.

It was surprisingly discovered, however, that mixing additional water into the bitumen froth prior to naphtha addition in a typical naphtha-based froth treatment process actually enhances the diluted bitumen product quality. This would seem somewhat counterintuitive, as one of the main purposes of froth treatment is to remove water. However, it was discovered that there is an inverse relationship between froth water content and diluted bitumen water content. Without being bound to theory, the product quality improvement may be due to the sweep flocculation or flocculation induced coalescence effects of the additional water, which acts as free or large water sacs. As large water sacs settle, small droplets and solids are brought down together with the large droplets. Consequently, a cleaner and drier diluted bitumen product resulted.

In one aspect, a method for processing bitumen froth to produce a diluted bitumen product having a reduced water and solids content is provided, comprising:

adding a sufficient amount of water to the bitumen froth and mixing the bitumen froth and water to form a froth/water mixture;

diluting the froth/water mixture with naphtha to form a diluted froth;

separating the water and solids from the diluted froth to produce the diluted bitumen product.

In one embodiment, the froth/water mixture comprises water up to about 60 wt %, which includes both the original water in froth and the added water. In one embodiment, the added water to froth ratio in the froth/water mixture ranged from 0.1 to 1.3 by mass. In one embodiment, naphtha is added to the froth/water mixture to give a naphtha to bitumen ratio of 0.3 to 1. In one embodiment, the water and solids are separated in a gravity separation vessel such as an inclined plate settler. In one embodiment, the water and solids are separated in a centrifuge.

In one embodiment, the diluted bitumen product comprises less than 3 wt % water. In one embodiment, the diluted bitumen product comprises less than 1.0 wt % water. In one embodiment, the diluted bitumen product comprises less than 0.5 wt % water. In one embodiment, the diluted bitumen product comprises less than 0.55 wt % solids. It is understood that there is a direct relationship between reduced water and reduced solids.

In one embodiment, the energy input into the bitumen froth and water mixture during mixing is between 250 and 5000 J/kg. In one embodiment, the diluted froth is also mixed and the energy input into the diluted froth is between 100 and 600 J/kg. In one embodiment, the energy input into the bitumen froth and water mixture during mixing is 1000 J/kg and the energy input into the diluted froth during mixing is 450 J/kg.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of an exemplary embodiment with reference to the accompanying simplified, diagrammatic, not-to-scale drawing.

DETAILED DESCRIPTION OF PREFERRED EMBODIMENTS

The detailed description set forth below in connection with the appended drawing is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practised without these specific details.

The present invention relates generally to a method for processing bitumen froth to produce a diluted bitumen product having reduced water and solids. In order to be suitable for further processing to produce an acceptable bitumen product quality to bitumen processing units. It is desirable for the diluted bitumen product to have a total water and solids concentration of less than about 2.5 wt %. Because bitumen froth can be of variable quality, it is necessary to have a method that can consistently deliver such a diluted bitumen product.

Figure 1:
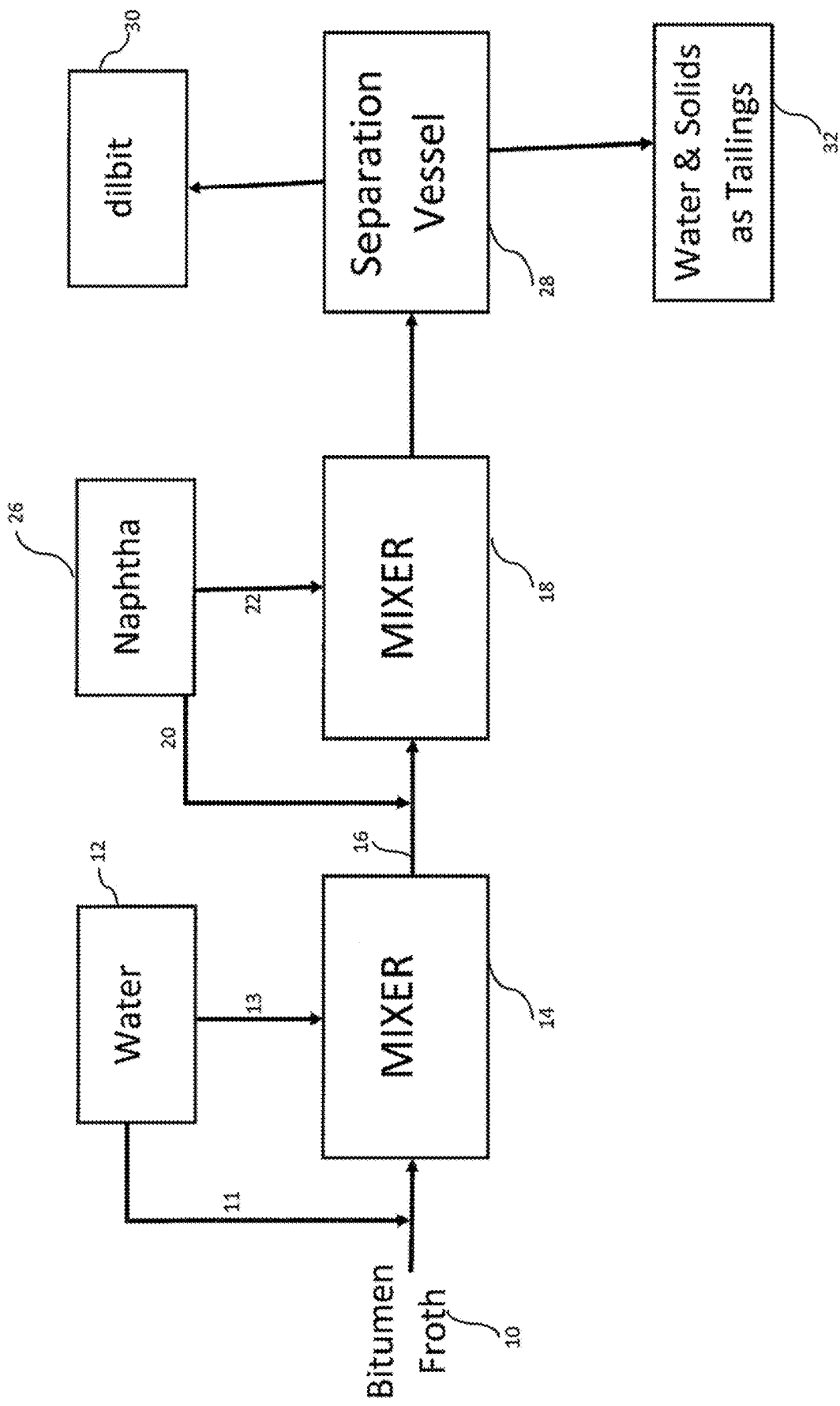
FIG. 1 is a schematic of an embodiment of a method for processing bitumen froth according to the present invention.

FIG. 1 is a general schematic of an embodiment of the present invention. As used herein, the term "bitumen froth" refers to a froth that is produced in any oil sand extraction process. Generally, bitumen froth comprises about 60 wt % bitumen, 30 wt % water and 10 wt % solids. However, the quality of the bitumen froth can vary due to the quality of oil sand being extracted, the temperature of the extraction process, etc. As used herein, "naphtha" refers to a low boiling point (<230° C.) hydrocarbon diluent. As used herein, "mixer" can be any type of mixing apparatus, including a mixing tank with one or more impellers with axial or mixed flow pattern such as a hydrofoil or pitched blade turbine, in-line mixers, pumps or any devices which provide sufficient shear. As used herein, "separation vessel" means any one-gravity settler such as an inclined plate settler, a settling vessel, etc. and/or a high gravity force apparatus that separates oil, water and solids by means of centrifugal acceleration, including centrifuges, cyclones, etc.

In the method of the invention shown in FIG. 1, raw deaerated bitumen froth 10 is used as the feed. Hereafter, the deaerated bitumen froth is also called bitumen froth in this invention. Raw bitumen froth 10 is initially received from an extraction facility which extracts bitumen from oil sand using a water based extraction process known in the art. The raw bitumen froth 10, as received, typically comprises about 60% bitumen, about 30% water and about 10% solids, and thus, needs to be further cleaned prior to upgrading.

Water 12 is added to the bitumen froth 10, either prior to mixing in mixer 14 (water stream 11) or added to the mixer as water stream 13, together with the bitumen froth 10. The bitumen froth/water is then mixed for a period of time, for example, between 1 and 30 minutes, more specifically at 10 minutes at a mixing speed of between about 300 to 1200 rpm, when the mixer is an axial impeller mixer. In one embodiment, water is added at a water to froth ratio of 0.1 to 1.3 by mass. Once the bitumen froth and water is sufficiently mixed, naphtha 26 is then added to the mixture and further mixed. In another embodiment, naphtha 26 can be added to the mixture 16 as naphtha stream 20 and then transferred to another mixer 18. In one embodiment, the mixture 16 is first added to mixer 18 and naphtha 26 is then added to mixer 18 as naphtha stream 22. In one embodiment, the ratio of naphtha solvent to bitumen (by wt %) ranges from about 0.3 to about 1.0.

The mixture of bitumen froth 10, water 12 and naphtha 26 is the subjected to separation in at least one separation vessel 28 to yield a product stream comprising a diluted bitumen product 30 and at least one by-product stream comprising water and solids, namely tailings 32. The product stream 30 comprises bitumen, naphtha diluent, and trace amounts of residual water and solids (possibly less than about 0.5 wt % total). The diluted bitumen product 30 is generally transferred to a diluent recovery unit (not shown) where naphtha is recovered, recycled and reused. The bitumen may be further treated in a fluid coker or ebullating-bed hydrocracker ("LC-Finer") and may be further processed into a synthetic crude oil product by means not shown but disclosed in the art.

EXAMPLE 1

Figure 2:
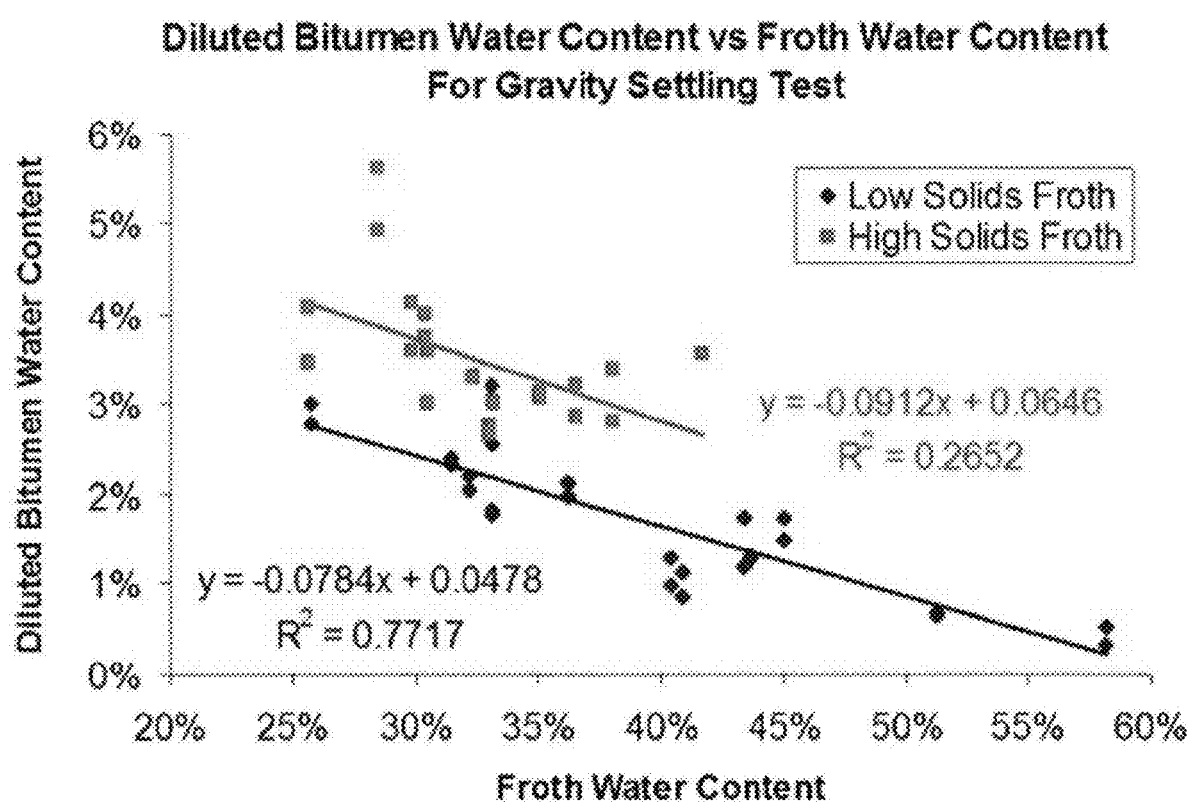
FIG. 2 is a graph showing the effects of froth quality on diluted bitumen product during froth treatment

Experiments were conducted to investigate the effects of bitumen froth quality, i.e., water and solids, on the water content of diluted bitumen product when bitumen froth is treated with naphtha at a naphtha to bitumen ratio of 0.7 and then subjected to gravity (1 G) settling up to 120 minutes. Two types of bitumen froths were tested, a low solids froth with solids content between 8 and 15 wt % and a high solids froth with solids content between 16 and 18 wt %. The water content of the two types of froth samples were varied from about 25 wt % to about 40 wt % for the high solids froth and from about 25 wt % to about 58 wt % for the low solids froth. The diluted bitumen product water content was then plotted against the bitumen froth water content, as shown in FIG. 2. Surprisingly, it was discovered that for both the low solids froth and the high solids froth, the more water that was present in the bitumen froth, the less water was found in the diluted bitumen product. This inverse relationship between froth water content and diluted bitumen water content is counter-intuitive.

Figure 3:
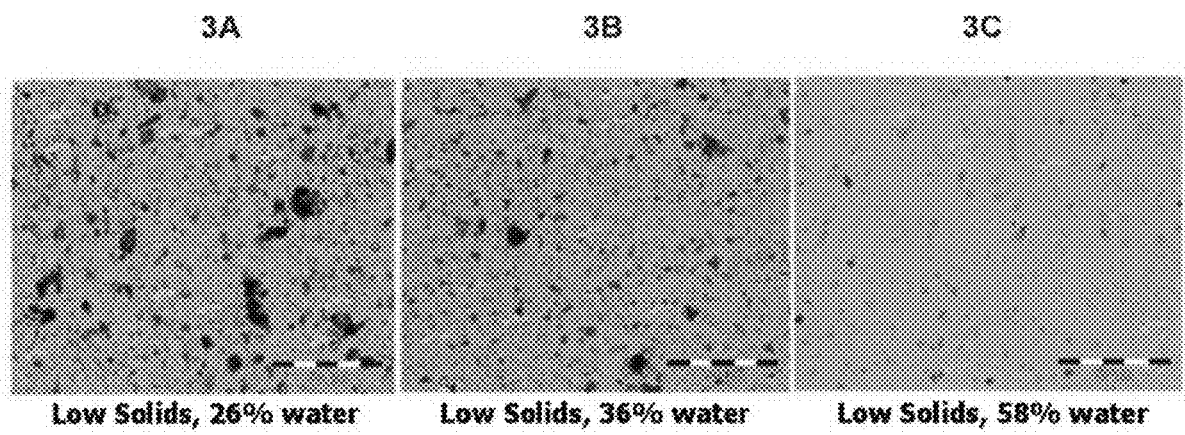
FIGS. 3A, 3B, and 3C are microscopic images of diluted bitumen product when a low solids bitumen froth having 26% water, 36% water and 58% water, respectively, are subjected to naphtha dilution and 120 minutes of 1 G settling.
Figure 4:
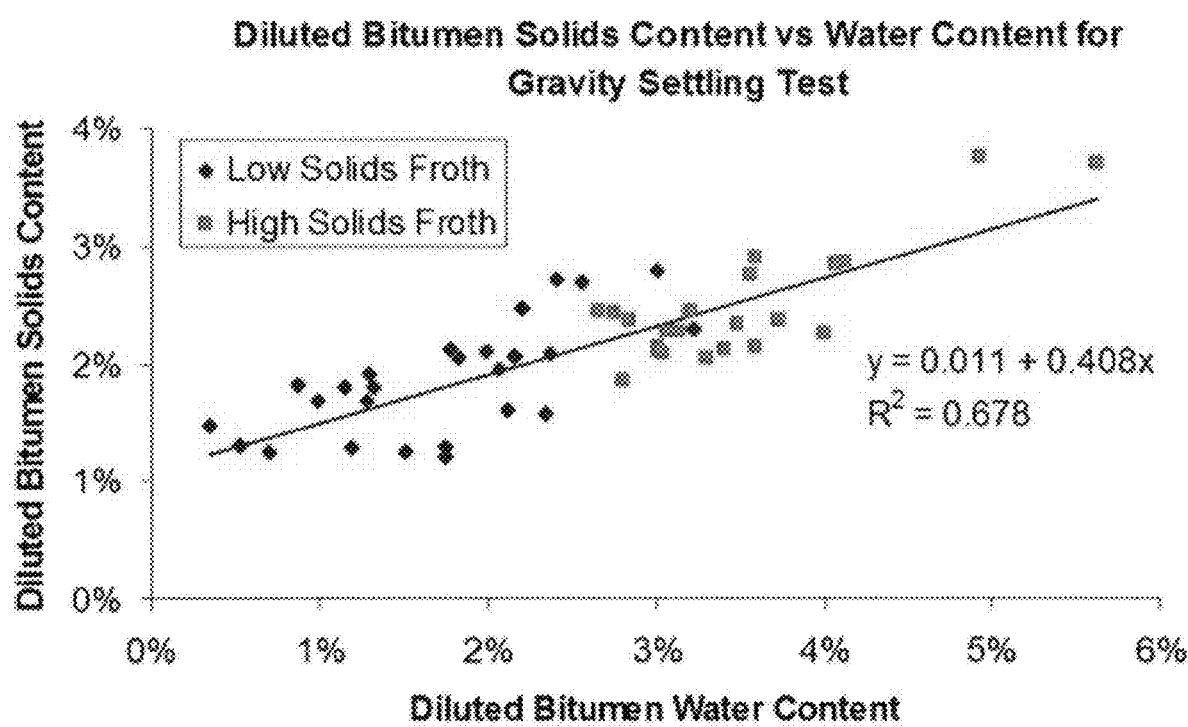
FIG. 4 is a graph showing the relationship between solids and water in a diluted bitumen product.

It was also discovered that for both the low solids froth and the high solids froth, the decrease in water content in the diluted bitumen product also resulted in reduced solids content in the diluted bitumen product. FIGS. 3A, 3B and 3C are micrographs showing the diluted bitumen quality of three froth water content samples for the low solids bitumen froths after two hours gravity separation in a settling vessel. FIG. 3A shows that when the low solids bitumen froth contained only 26% water, there were still a lot of solids and dispersed water droplets present in the diluted bitumen product. However, FIG. 3B shows a significant decrease in solids and dispersed water droplets in the diluted bitumen product when more free water was present in the low solids bitumen froth containing a water content of 36 wt %. It can be seen in FIG. 3C that when the bitumen froth had a water content of 58 wt %, the diluted bitumen product was drier and cleaner showing a significant decrease in water and solids contents. The reduction in diluted bitumen solids content versus diluted bitumen water content is shown in FIG. 4. Thus, increasing the water content in bitumen froth resulted in a decrease in both water content and solids content in final diluted bitumen product.

EXAMPLE 2

Figure 5:
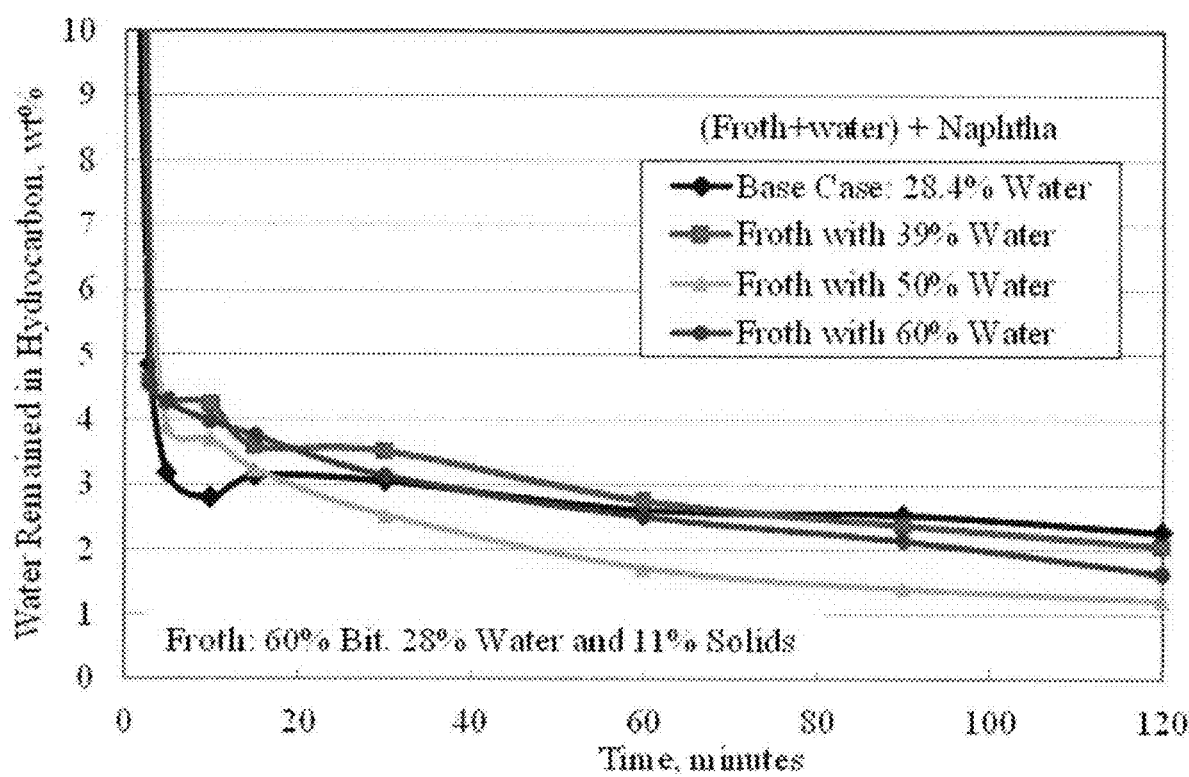
FIG. 5 is a graph showing the water remaining in a diluted bitumen product when water is added to a bitumen froth prior to the addition of naphtha and subjected to up to 120 minutes of 1 G settling.

The outcome of Example 1 lead to the concept of adding water to bitumen froth to increase the free water portion and enhancing the diluted bitumen product quality. In this example, the question of whether the water should be added prior to or after naphtha addition was addressed. In one instance, water was added to the bitumen froth (froth+water) prior to addition of naphtha and, in another instance, naphtha was first added to the bitumen froth (froth+naphtha), followed by water addition. The bitumen froth used in both experiments comprised 60 wt % bitumen, 28 wt % water and 11 wt % solids, which served as the base case (i.e., 28 wt % water). FIG. 5 is a graph of water remaining in the diluted bitumen product (hydrocarbon), in wt %, versus the settling time in a separation vessel, in minutes. Naphtha to bitumen ratio of 0.7 was used. Added water to froth ratio ranged from 0 (base case) to 1.3 by mass.

It can be seen in FIG. 5 that after 120 minutes of settling time, increasing the water content in bitumen froth resulted in a decrease in diluted bitumen water content. However, it was observed that a further increase in water would lead to higher water remained in diluted bitumen. The results suggested that there is an optimum water addition level. In this example, the optimum level is water to froth ratio of 1.

Figure 6:
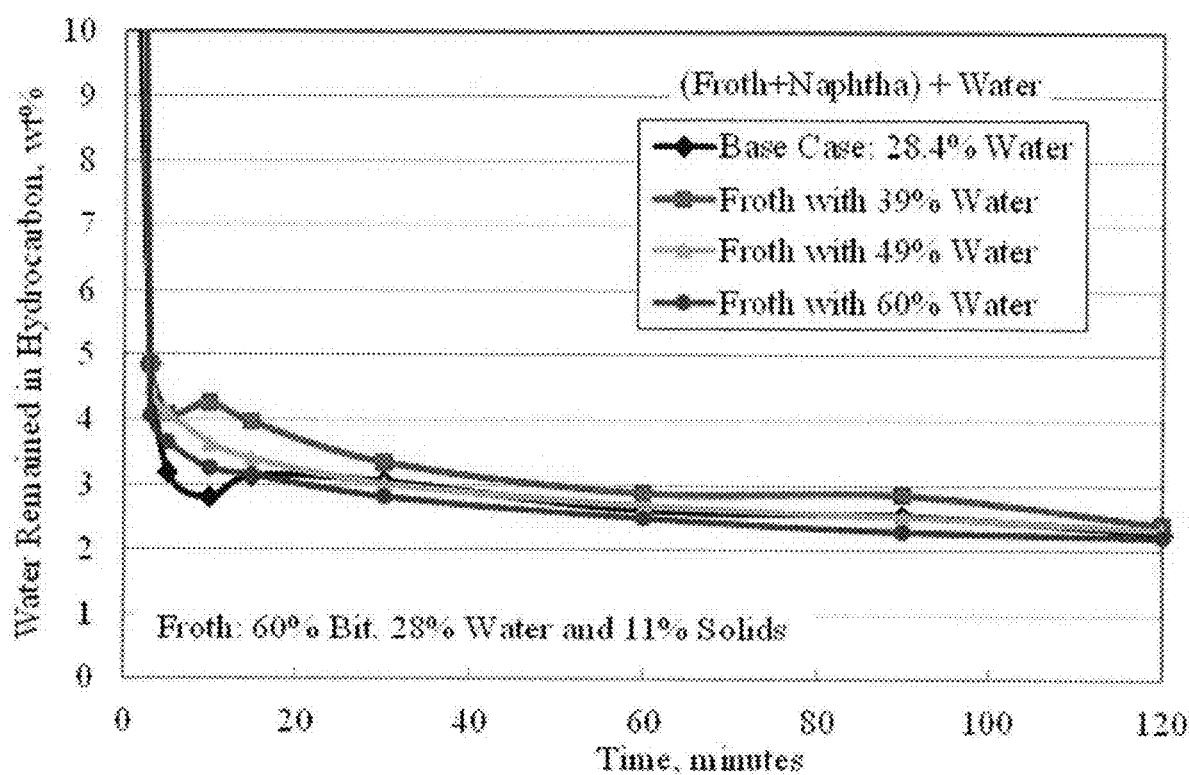
FIG. 6 is a graph showing the water remaining in a diluted bitumen product when water is added to a naphtha-diluted bitumen froth and subjected to up to 120 minutes of 1 G settling.

When water was added after bitumen froth treatment with naphtha, at a naphtha to bitumen ratio of 0.7, the reduction in water content of the diluted bitumen product was significantly less. FIG. 6 is a graph of water remaining in the diluted bitumen product (hydrocarbon), in wt %, versus the settling time in a separation vessel, in minutes. It can be seen in FIG. 6 that after 120 minutes of settling time, increasing the water content in bitumen froth+naphtha to 39 wt %, 50 wt % and 60 wt % resulted in a only a very slight decrease in water content of diluted bitumen froth. These results suggest that it is more beneficial to add wash water prior to naphtha dilution. Without being bound to theory, the density of bitumen and water are similar while water is denser than the naphtha diluted froth. Therefore, in the former case (before naphtha addition) similar density between bitumen and water prior to naphtha addition is found to be important in enhancing diluted bitumen product quality.

EXAMPLE 3

Figure 7:
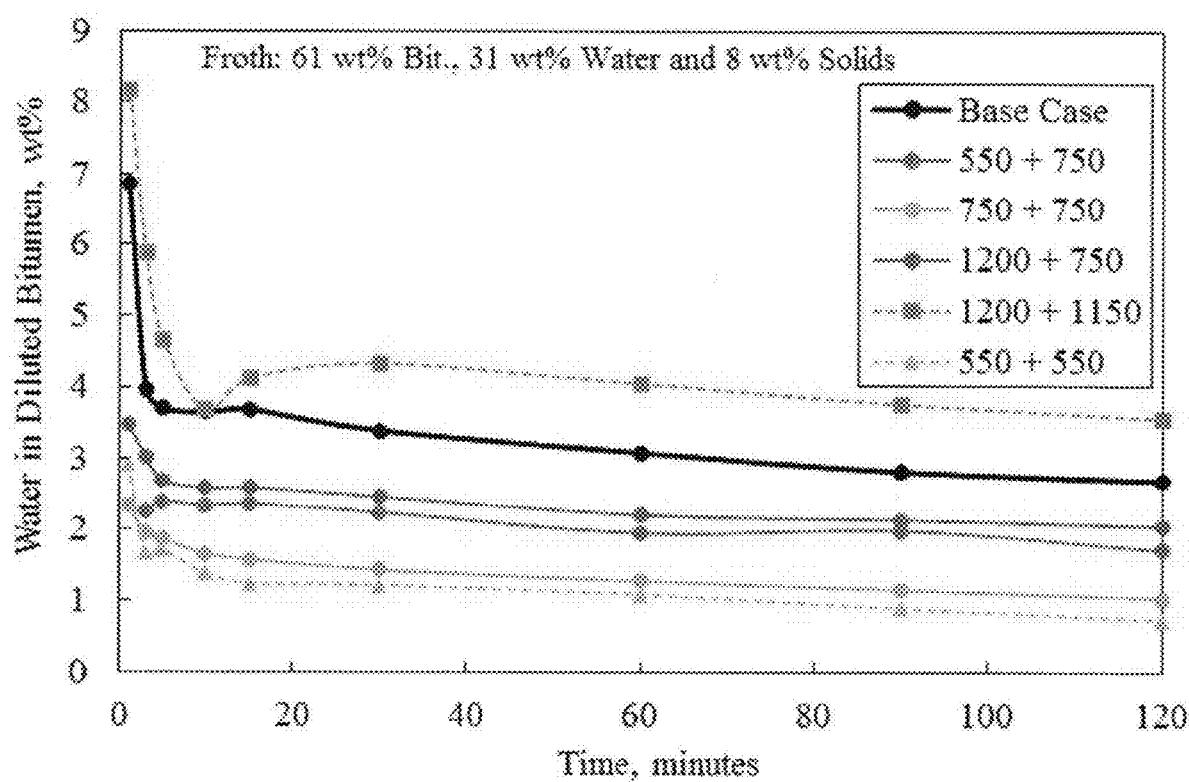
FIG. 7 is a graph showing the effect of bitumen froth/water mixing and bitumen froth/water plus naphtha mixing on the water content of diluted bitumen product.

The impact of mixing was also investigated. The bitumen froth used comprised 61 wt % bitumen, 31 wt % water and 8 wt % solids (base case). The first and second numbers in the legend of FIG. 7 represent the mixing speed for (bitumen froth+water) mixing (hereinafter referred to as "Stage 1 mixing") and ((mixed bitumen froth/water)+naphtha) mixing (hereinafter referred to as "Stage 2 mixing"), respectively. Higher mixing speeds would result in more energy added to the mixture. However, it is understood that energy input is also dependent upon the viscosity of the fluid being mixed. For example, the viscosity of (bitumen froth+water) averages about 1000 cp, while the viscosity of ((mixed bitumen froth/water)+naphtha) averages about 5 cp. The added water to froth ratio is 1 by mass and the added naphtha to bitumen ratio is 0.7. The wt % water in diluted bitumen product was plotted against settling time, in minutes.

It can be seen in FIG. 7 that when (bitumen froth+water) is first mixed, followed by addition of naphtha and additional mixing, in most instances, there was a significant decrease in the water content in the diluted bitumen product. However, the effects of overmixing can also be seen in FIG. 7. For example, when the (bitumen froth+water) is mixed at 1200 rpm, followed by naphtha addition and further mixing at 1150 rpm, there was actually an increase in the amount of water in the diluted bitumen product. Without being bound to theory, it is believed that over-mixing may lead to increase in diluted bitumen product water as results of formation of additional emulsion due to high shear. It was discovered that moderate mixing in both Stage 1 and Stage 2 mixing, e.g., 550 rpm and 550 rpm, respectively, resulted in the greatest reduction of water in the diluted bitumen product, i.e., a reduction from about 3 wt % to about 0.75 wt % after 120 minutes of settling time. In FIG. 7, the focus is on the froth and water mixing and it was found that the best froth and water mixing was at 550 rpm, corresponding to an energy input of 1000 J/kg.

Figure 8:
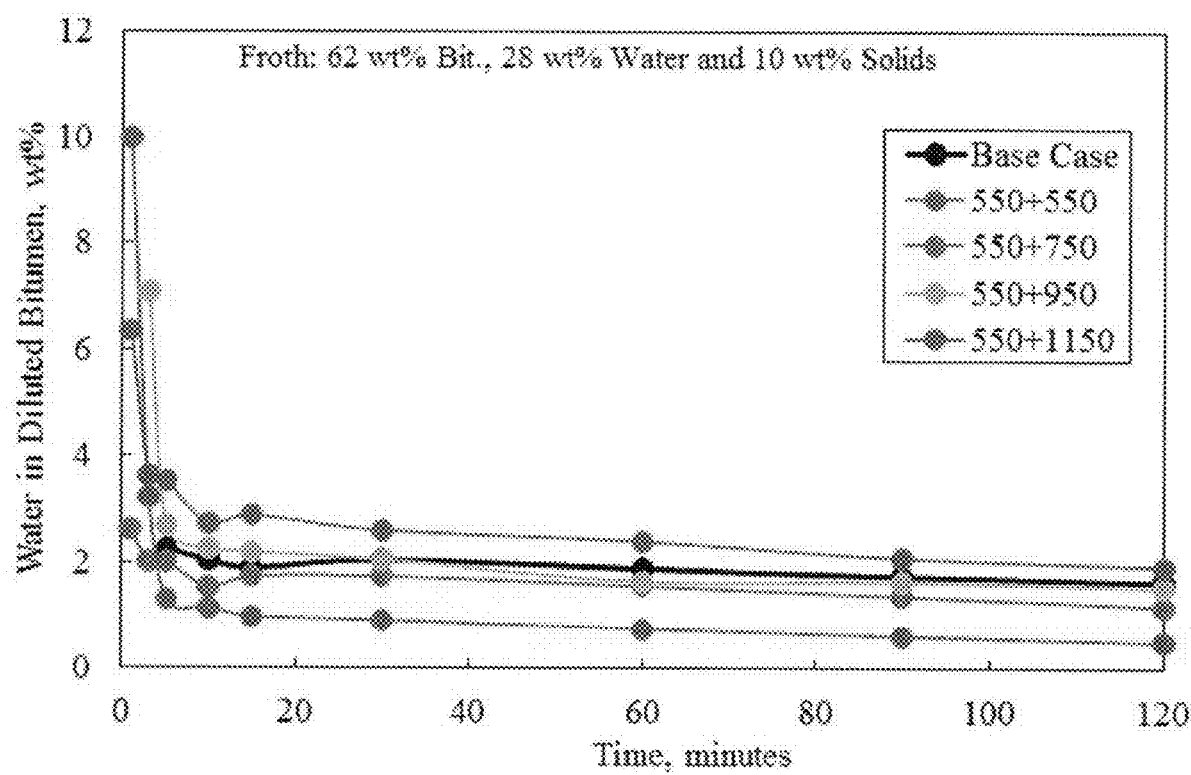
FIG. 8 is a graph showing the effect of adding water to bitumen froth, followed by the addition of naphtha and mixing of the froth/water/naphtha on the water content of diluted bitumen product.

In FIG. 8, the effect of Stage 2 mixing conditions was determined. Naphtha to bitumen ratio of 0.7 was used. In this case, Stage 1 mixing was fixed at 550 rpm. The bitumen froth used comprised 62 wt % bitumen, 28 wt % water and 10 wt % solids. The results showed that the best Stage 2 mixing condition occurred at 550 rpm. The diluted bitumen product water achieved was 0.5 wt %. FIGS. 7 and 8 demonstrate that the best mixing conditions for Stage 1 mixing and Stage 2 mixing was 550 rpm and 550 rpm, respectively, corresponding to an energy input of 1000 J/kg and 450 J/kg, respectively. It should be point out that two different froth samples were used with consistent results on product quality enhancement.

EXAMPLE 4

The effect of 1 G settling versus high G centrifugation was also tested to see if the method for water and solids separation would have any effect on the final diluted bitumen product quality. In all tests, a naphtha to bitumen ratio of 0.7 was used. It was discovered that, with certain bitumen froth samples, high G separation resulted in higher quality product.

Figure 9A:
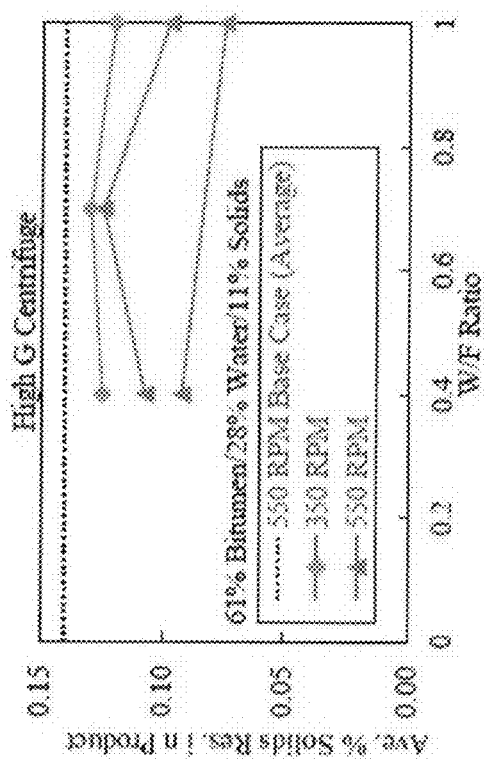
FIGS. 9A-9D show comparisons between 1 G settling and high G centrifugation on both the water content and solids content in diluted bitumen product (Stage 2 mixing speed fixed at 550 RPM).
Figure 9B:
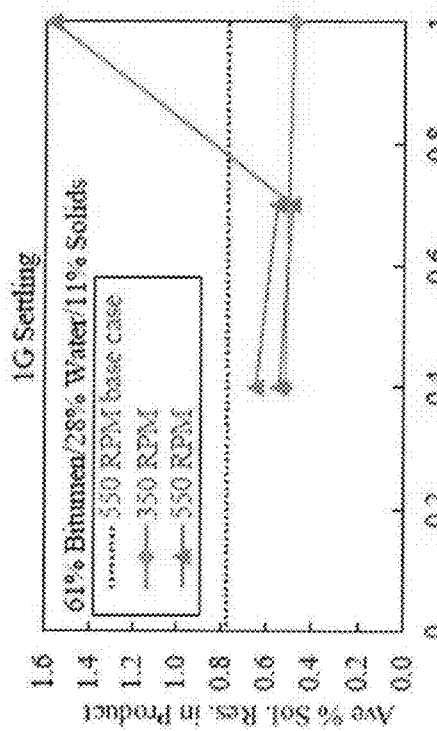
Figure 9C:
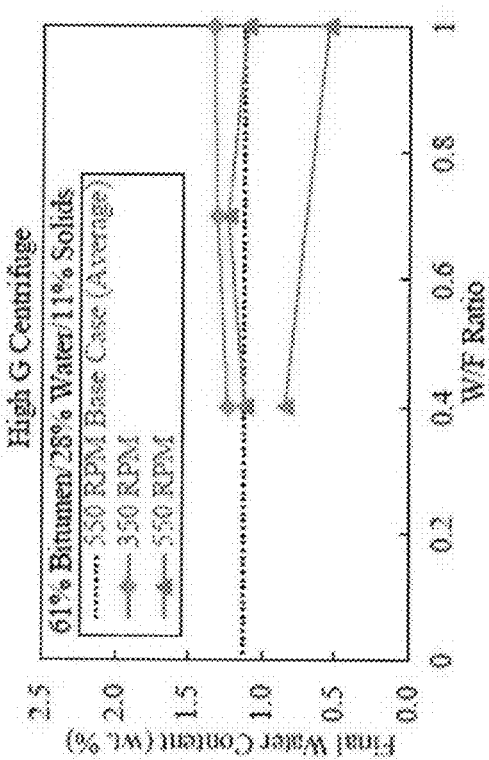
Figure 9D:
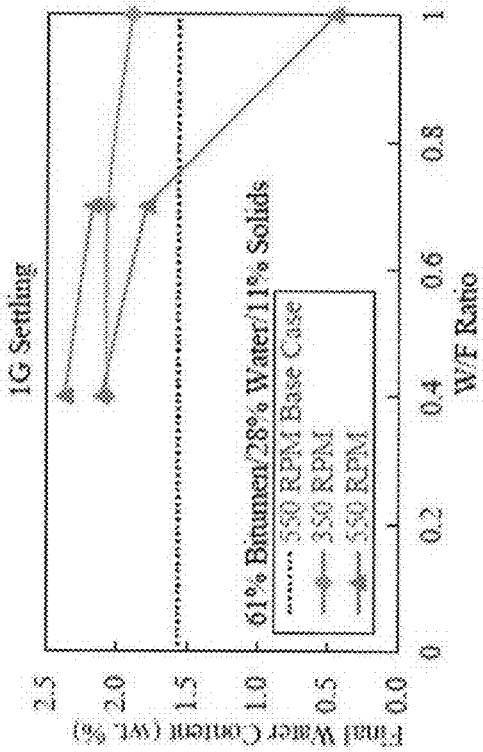

In particular, with one bitumen froth tested, which comprised 61% bitumen, 28% water and 11% solids, using 1 G settling resulted in the final water content in the diluted bitumen product being reduced to about 0.5 wt % when a W/F ratio of 1 was used (Stage 1 mixing=550 RPM; and Stage 2 mixing=550 RPM) as shown in FIG. 9C. However, surprisingly, the solids content in the diluted bitumen product was much higher than the base case where no water was added (with other conditions remaining the same), i.e., about 1.5 average % solids (see FIG. 9A). On the other hand, when high G centrifugation was used to separate the water/solids from the water treated bitumen froth, FIG. 9D shows that when a W/F ratio of 1 was used (Stage 1 mixing=550 RPM and Stage 2 mixing=550 RPM), the final water content in the diluted bitumen was also about 0.5 wt %. However, FIG. 9B shows that the average % solids in the product was only 0.075, well below the base case. Thus, for this particular bitumen froth, high G centrifugation was required to achieve the desired results of both reduced water content and solids content.

EXAMPLE 5

The effects of various W/F ratios and 1 G settling versus high G centrifugation on the water content in a diluted bitumen product were determined for bitumen froths with poor processability. Generally, froths having poor processability are those froths that have a low bitumen content and high solids content. Two poor froths were tested: Froth 1 comprising 49% bitumen, 26% water and 25% solids, and Froth 2 comprising 54% bitumen, 27% water and 19% solids. In all tests, a naphtha to bitumen ratio of 0.7 was used.

Figure 10A:
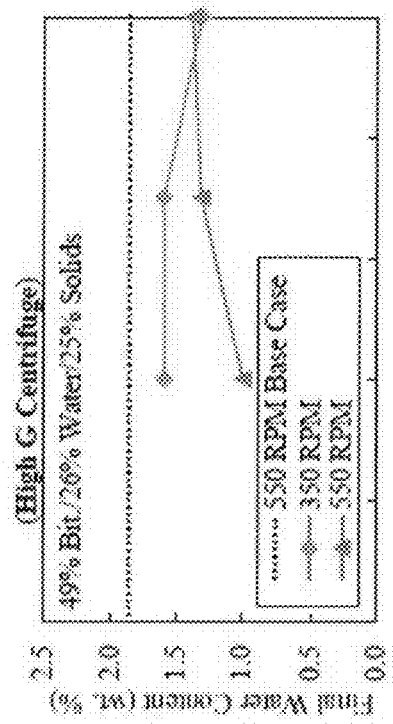
FIGS. 10A-10D show comparisons between 1 G settling and high G centrifugation on the water content in diluted bitumen product using poor processability bitumen froths (Stage 2 mixing speed fixed at 550 RPM).
Figure 10B:
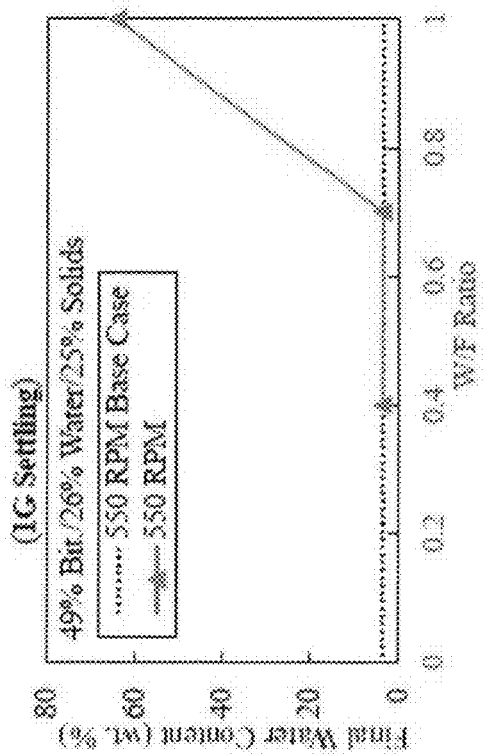
Figure 10C:
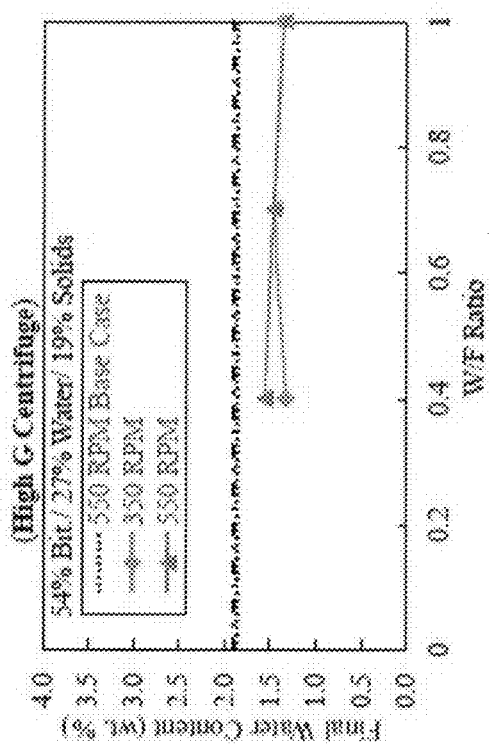
Figure 10D:
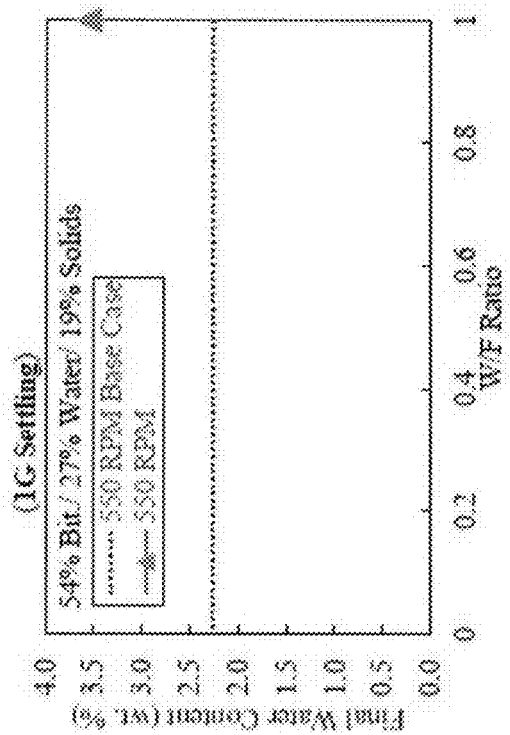

For both Froth 1 and Froth 2, when using Stage 1 mixing of 550 RPM and Stage 2 mixing of 550 RPM, no reduction in water content in the diluted bitumen product over the base case was observed for any of the W/F ratios tested when using 1 G settling (see FIG. 10A and FIG. 10C, respectively). However, when high G centrifugation was used under the same conditions, FIG. 10B and FIG. 10D show a reduction in water content in the final product at W/F ratios of 0.4, 0.6, 0.8 and 1 for Froth 1 and Froth 2, respectively.

From the foregoing description, one skilled in the art can easily ascertain the essential characteristics of this invention, and without departing from the spirit and scope thereof, can make various changes and modifications of the invention to adapt it to various usages and conditions. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A method for processing bitumen froth to produce a diluted bitumen product having a reduced water and solids content, comprising:
   adding a sufficient amount of water to the bitumen froth, wherein water was added to the bitumen froth at a water to froth ratio ranging from 0.1 to 1.3 by mass, and mixing the bitumen froth and water in a mixer, wherein the energy input during mixing of the bitumen froth and water is between 250 and 5000 J/kg, to form a froth/water mixture;
   diluting the froth/water mixture with naphtha to form a diluted froth; and
   separating the water and solids from the diluted froth to produce the diluted bitumen product.

2. The method as claimed in claim 1, further comprising mixing the diluted froth in a mixer prior to separating the water and solids from the diluted froth to produce the diluted bitumen product.

3. The method as claimed in claim 1, wherein naphtha was added to the froth/water mixture at a naphtha to bitumen ratio of 0.3 to 1.

4. The method as claimed in claim 1, wherein the diluted bitumen product comprises less than 3 wt % water.

5. The method as claimed in claim 1, wherein the diluted bitumen product comprises less than 0.5 wt % water.

6. The method as claimed in claim 1, wherein the diluted bitumen product comprises less than 0.55 wt % solids.

7. The method as claimed in claim 2, wherein the energy input during mixing of the diluted froth is between 100 and 600 J/kg.

8. The method as claimed in claim 2, wherein the energy input during mixing of the bitumen froth and water is 1000 J/kg and the energy input during mixing of the diluted froth is 450 J/kg.

9. The method as claimed in claim 7, wherein naphtha was added to the froth/water mixture at a naphtha to bitumen ratio of 0.3 to 1.

10. The method as claimed in claim 1, wherein the step of separating the water and solids from the diluted froth occurs at 1 G.

11. The method as claimed in claim 1, wherein the step of separating the water and solids from the diluted froth occurs at greater than 1 G.

12. The method as claimed in claim 1, wherein the step of separating the water and solids from the diluted froth occurs in an inclined plate settler.

13. The method as claimed in claim 1, wherein the step of separating the water and solids from the diluted froth occurs in a centrifuge.

14. The method as claimed in claim 2, wherein the step of separating the water and solids from the diluted froth occurs at 1 G.

15. The method as claimed in claim 2, wherein the step of separating the water and solids from the diluted froth occurs at greater than 1 G.

16. The method as claimed in claim 2, wherein the step of separating the water and solids from the diluted froth occurs in an inclined plate settler.

17. The method as claimed in claim 2, wherein the step of separating the water and solids from the diluted froth occurs in a centrifuge.

* * * * *